UNITED STATES PATENT OFFICE.

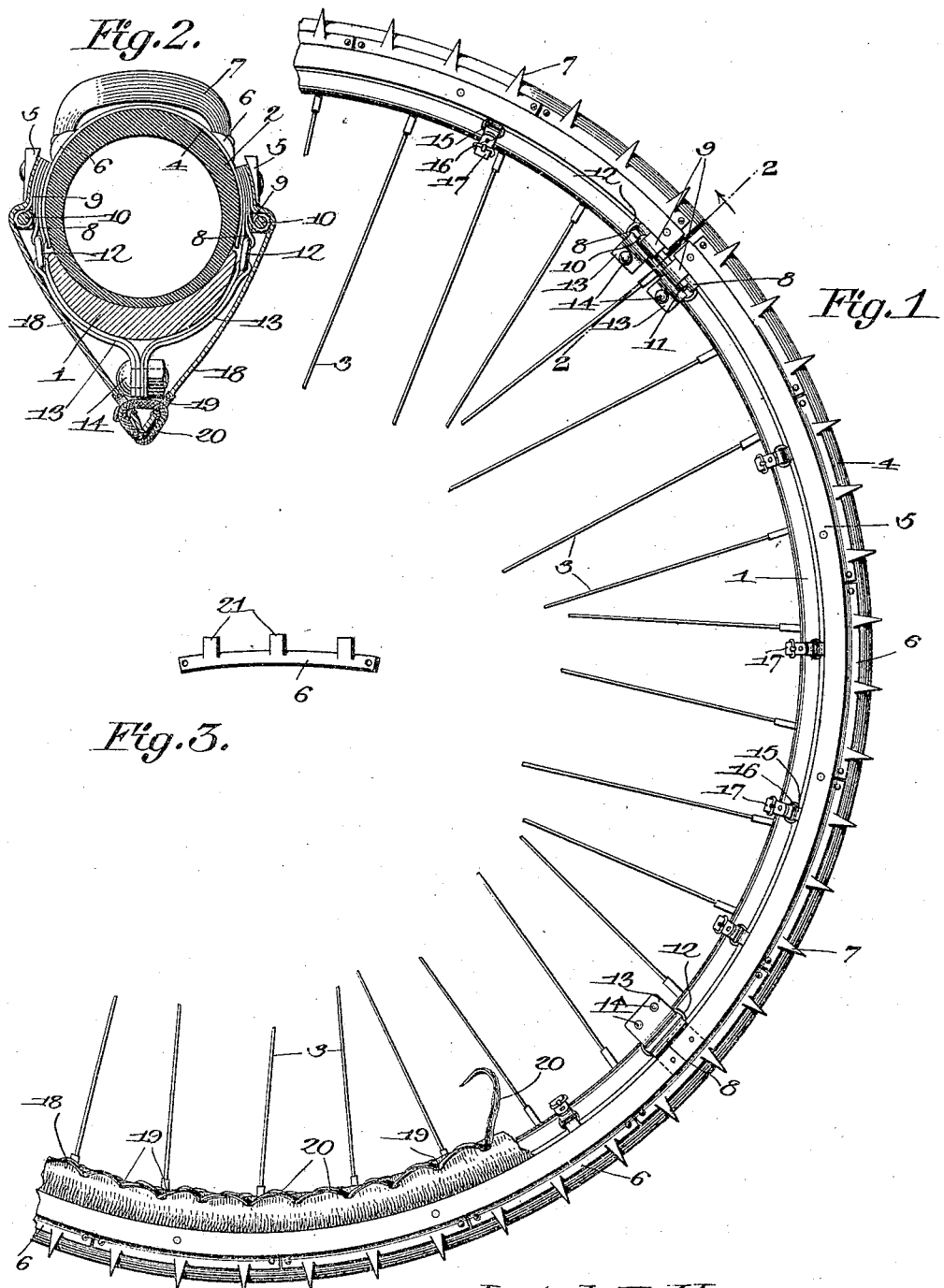

JOSIAH F. HORN, OF HAZLETON, PENNSYLVANIA.

WHEEL-TIRE ATTACHMENT.

No. 806,810.      Specification of Letters Patent.      Patented Dec. 12, 1905.

Application filed June 21, 1905. Serial No. 266,283.

*To all whom it may concern:*

Be it known that I, JOSIAH F. HORN, a citizen of the United States, residing at Hazleton, in the county of Luzerne and State of Pennsylvania, have invented a new and useful Wheel-Tire Attachment, of which the following is a specification.

My invention relates to armors for vehicle-wheel tires, and especially to armors for inflatable tires.

The object of my invention is to provide a device of the class which may be applied to any class of wheels to increase the traction and prevent slipping.

A further object of my invention is to provide a device of the class with a covering to exclude dirt and mud.

With these and other objects in view the present invention consists in the combination and arrangement of parts, as will be hereinafter fully described, shown in the accompanying drawings, and particularly pointed out in the appended claims, it being understood that changes in the form, proportions, size, and minor details may be made without departing from the spirit or sacrificing any of its advantages.

In the drawings, Figure 1 is a view in side elevation of a fragment of a wheel with my improved armor mounted thereon. Fig. 2 is a transverse sectional view of a rim and tire with my improved armor mounted thereon and taken on line 2 2 of Fig. 1. Fig. 3 is a detail view of a modified form of the gated traction-lugs.

Like characters of reference designate corresponding parts throughout the several views.

My invention is designed to be mounted upon any wheel, as upon the wheel comprising the rim 1, tire 2, and spokes 3. In its preferred embodiment my improved armor comprises a sheet-metal casing 4, conforming to about the outer half of the tire 2 and made in segments of any approved number, meeting as at line 2 2. Adjacent each edge of casing 4 is secured a segmental rigid band 5, with its inner edge conforming to the inner arc of the casing and of substantially equal length. To the sides of the casing 4 and adjacent the band 5 are secured the lug members, consisting of the side bars 6, riveted to the casing, and the integral lugs 7, arching the casing. Adjacent each end of each segment loops 8 and 9 are clamped between the band 5 and the casing 4. Through adjacent loops 9 is passed a bolt 10, upon the end of which is placed a nut 11, arranged to draw together the loops 9 and the segments to which they are secured, thus clamping the casing upon the tire. The loops 8 are provided with rings 12, to which are secured clips 13, which by means of bolts 14 clamp the casing upon the wheel. At convenient points about the inner edge of the casing 4 are secured clips 15, in which are secured rings 16, and through the rings are passed straps 17, which also serve to secure the casing upon the wheel. Between the band 5 and the casing 4 is also secured a fabric 18, extending inwardly toward the center of the wheel and provided along their edges with holes 19, through which the lacing 20 is passed to draw the edges together and protect the rim and the fastening devices from mud and dirt.

The lugs may be provided with sharpened edges, as shown at 7, for use upon ice and the like, or without edges, as shown at 21 in Fig. 3, for use in sand and mud.

It is believed that from the foregoing description the use and operation of my improved tire-armor will be wholly and clearly understood.

Having thus described the invention, what is claimed is—

1. In a device of the class described, a nonelastic tire-casing, and spaced lugs secured upon opposite sides of and arched above the casing.

2. In a device of the class described, a nonelastic tire-casing and spaced lugs secured to and upon opposite sides of and arched above the casing.

3. In a device of the class described, a nonelastic tire-casing, strips provided with spaced lugs and secured upon opposite sides of and with the lugs arched above the casing.

4. In a device of the class described, a nonelastic tire-casing, strips provided with spaced lugs and secured to and upon opposite sides of and with the lugs arched above the casing.

5. In a device of the class described, a nonelastic tire-casing, spaced lugs arched above and secured at their opposite ends upon opposite sides of the casing.

6. In a device of the class described, a tire-casing, strips secured upon opposite sides of the casing and spaced lugs arched above the casing and secured at their opposite ends to the strips.

7. In a device of the class described, a nonelastic tire-casing, strips secured upon opposite sides of the casing and spaced lugs arched above the casing and secured at their opposite ends to the strips.

8. In a device of the class described, a tire-casing and spaced lugs arching and spaced above the casing.

9. In a device of the class described, a non-elastic tire-casing and spaced lugs arching and spaced above the casing.

10. In a device of the class described, a non-elastic tire-casing, and strips provided with spaced lugs secured to and with the lugs arching and spaced above the casing.

11. In a device of the class described, a rim, an inflatable tire, segmental rigid bands adjacent the edges and upon each side of the rim, strips secured adjacent the bands and spaced lugs secured at each end to the strips and arching the tire.

12. In a device of the class described, a tire-casing rigid strips secured upon opposite sides of and carrying lugs arched and spaced above the casing.

13. In a device of the class described, a rim, an inflatable tire mounted in the rim, a rigid segmental band spaced upon opposite sides of the tire, strips provided with spaced lugs secured to the band and with the lugs arching the tire and means for securing the band and strips to the rim.

14. In a device of the class described, a rim, a tire, a non-elastic tire-casing, strips provided with spaced lugs secured to and arching the casing.

15. In a device of the class described, a rim, a tire mounted within the rim, a non-elastic tire-casing, a rigid segmental band secured to the casing and strips provided with spaced lugs secured to and the lugs arching the casing.

16. In a device of the class described, a rim, an inflatable tire mounted within the rim, a non-elastic tire-casing, rigid segmental bands secured to and adjacent the edges of the casing, strips provided with spaced lugs secured to the casing adjacent the bands and means for securing the casing upon the tire.

17. In a device of the class described, a rim, an inflatable tire mounted upon the rim, a segmental non-elastic casing covering the outer periphery of the tire, strips provided with spaced lugs secured to and the lugs arching the casing and means for drawing the segments together to clamp the casing upon the tire.

18. In a device of the class described, a rim, a tire mounted upon the rim a segmental non-elastic casing covering the outer periphery of the tire, a segmental band secured adjacent the edge of the casing, strips provided with spaced lugs secured to and the lugs arching the casing and means for drawing the segments together to clamp the casing upon the tire.

19. In a device of the class described, a rim, a tire mounted upon the rim, a tire-armor, means for securing the armor upon the tire and a flexible cover secured to the armor and arranged to cover the rim and armor-securing device.

20. In a device of the class described, a rim, a tire mounted upon the rim, a tire-armor, means for securing the armor upon the tire a fabric secured to the armor and means for covering the rim and the armor-securing device with the fabric.

21. In a device of the class described, a rim, a tire mounted upon the rim, a tire-armor, means for securing the armor upon the tire, a fabric secured to the armor and means for bringing together the edges of the fabric to cover the rim and the armor-securing device.

22. In a device of the class described, a rim, an inflatable tire mounted upon the rim, a non-elastic tire-casing a band secured to the casing, a fabric secured between the band and the casing and means for drawing together the edges of the fabric over the rim.

23. In a device of the class described, a rim, an inflatable tire mounted upon the rim, a segmental non-elastic tire-casing, a segmental band secured to the casing, means for securing the segments upon the rim, a fabric clamped between the casing and the band and means for drawing together the edges of the fabric to cover the rim and casing-securing device.

24. In a device of the class described, a rim, an inflatable tire mounted upon the rim a segmental non-elastic tire-casing, segmental bands secured to the casing-segments, strips provided with spaced lugs secured to and the lugs arching the casing, means for drawing together the segments, means for securing the casing upon the tire, a fabric clamped between the casing and the band and means for lacing the edges of the fabric over the rim and the casing-securing device.

In testimony that I claim the foregoing as my own I have hereto affixed my signature in the presence of two witnesses.

JOSIAH F. HORN.

Witnesses:
JAMES J. BOYLE,
WM. H. SCHUTTER.